(12) United States Patent
Spanjers

(10) Patent No.: US 6,269,629 B1
(45) Date of Patent: Aug. 7, 2001

(54) MICRO-PULSED PLASMA THRUSTER HAVING COAXIAL CABLE SEGMENT PROPELLANT MODULES

(75) Inventor: Gregory G. Spanjers, Helendale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/330,720

(22) Filed: Jun. 11, 1999

Related U.S. Application Data

(60) Provisional application No. 60/097,034, filed on Aug. 17, 1998.

(51) Int. Cl.[7] ................. G21D 1/00; H05B 1/00
(52) U.S. Cl. .................................................... 60/203.1
(58) Field of Search ............................. 60/203.1, 200.1

(56) References Cited

U.S. PATENT DOCUMENTS

| | | | |
|---|---|---|---|
| 4,548,033 | * | 10/1985 | Cann ................................. 60/203.1 |
| 5,924,278 | * | 7/1999 | Burton et al. ..................... 60/203.1 |

* cited by examiner

Primary Examiner—Timothy S. Thorpe
Assistant Examiner—William Rodriguez
(74) Attorney, Agent, or Firm—Thomas C. Stover

(57) ABSTRACT

A single energy storage capacitor is used to apply electrical energy to selected propellant modules, each module generating thrust in a desired direction by the high voltage induced vaporization of the copolymer spacer material in a conventional coaxial cable within the selected module. A lightweight, low cost, and EMI free thruster is thus provided.

24 Claims, 1 Drawing Sheet

MICRO-PULSED PLASMA THRUSTER HAVING COAXIAL CABLE SEGMENT PROPELLANT MODULES

This application claims the benefit of U.S. Provisional Application No. 60/097,034 filed Aug. 17, 1998.

STATEMENT OF GOVERNMENT INTEREST

The present invention may be made by or for the Government for governmental purposes without the payment of any royalty thereon.

BACKGROUND OF THE INVENTION

There is a need for improved plasma thrusters for attitude control, station-keeping, and primary propulsion of very small satellites in space such as "Microsats" weighing less than 20 kg and "Nanosats" weighing less than one kg. These small satellites are expected to be widely used for Air Force and commercial applications. Such attitude control thrusters should be packaged in small lightweight containers and be highly efficient so as to employ small amounts of energy, typically about one watt. Relative to standard sized satellite thrusters, such small pulsed plasma thrusters (PPT), having 10–100 size reductions, should eliminate the prior art PPT which require separate spark plug igniter devices, in favor of lightweight components permitting precise control of a number of small impulse propellant modules, by means of a single electrical pulser for selectively actuating desired propellant impulse producing modules via a plurality of transmission lines.

It is desired to provide a reduction of attitude control system (ACS) thruster mass by ninety percent or more, obtained by eliminating conventional torque rods or reaction wheels, in accordance with the placement of lightweight low cost propellant modules at the corners of the spacecraft, each module independently and selectively controlled by a single low mass centrally located pulse generating thruster control device which can employ an energy storage capacitor. Also, the arrangement has none of the aforesaid prior art spark plug igniters. The use of standard, readily available components, such as those previously flight qualified, is also desired.

SUMMARY A PREFERRED EMBODIMENT OF THE INVENTION

The aforesaid needs are met by providing a precisely controlled microPPT, e.g. one watt, producing small reproducible impulse bits of thrust by means of a plurality of coaxial cable propellant modules, providing increased thrust for a small fixed discharge energy, which reduces the volume required to store the propellant mass and which decreases radiated electromagnetic interference (EMI) relative to prior thrusters. More specifically, each propellant module, which can be positioned at a selected outer portion of the satellite, comprises a semi-rigid section of an ordinary low cost coaxial cable. High voltage pulses, initiated by a charged energy storage capacitor of a thruster control pulse generator, are selectively impressed or discharged across the outer conductive cylindrical wall of an ordinary coaxial cable segment of each propellant module and its inner central conductor, to produce vaporization of the solid "TEFLON" polymer spacer or filler, separating the inner and outer conductors, and in turn generating small precise impulse forces oriented to permit easy attitude satellite control. The result is a lightweight PPT having no sparkplug igniter, and using significantly less propellant to perform a given small satellite maneuver than alternative designs such as cold gas thrusters and those using thermal acceleration. Changing the capacitor discharge frequency and thus the frequency of the resulting pulse train applied across the coax components can also be used to change the degree of thrust.

BRIEF DESCRIPTION OF THE DRAWING

Other features of the invention will become more apparent upon study of the following description, taken in conjunction with the sole figure schematically illustrating one embodiment of the invention.

DETAILED DESCRIPTION OF A PREFERRED EMBODIMENT OF THE INVENTION

Figure 1:
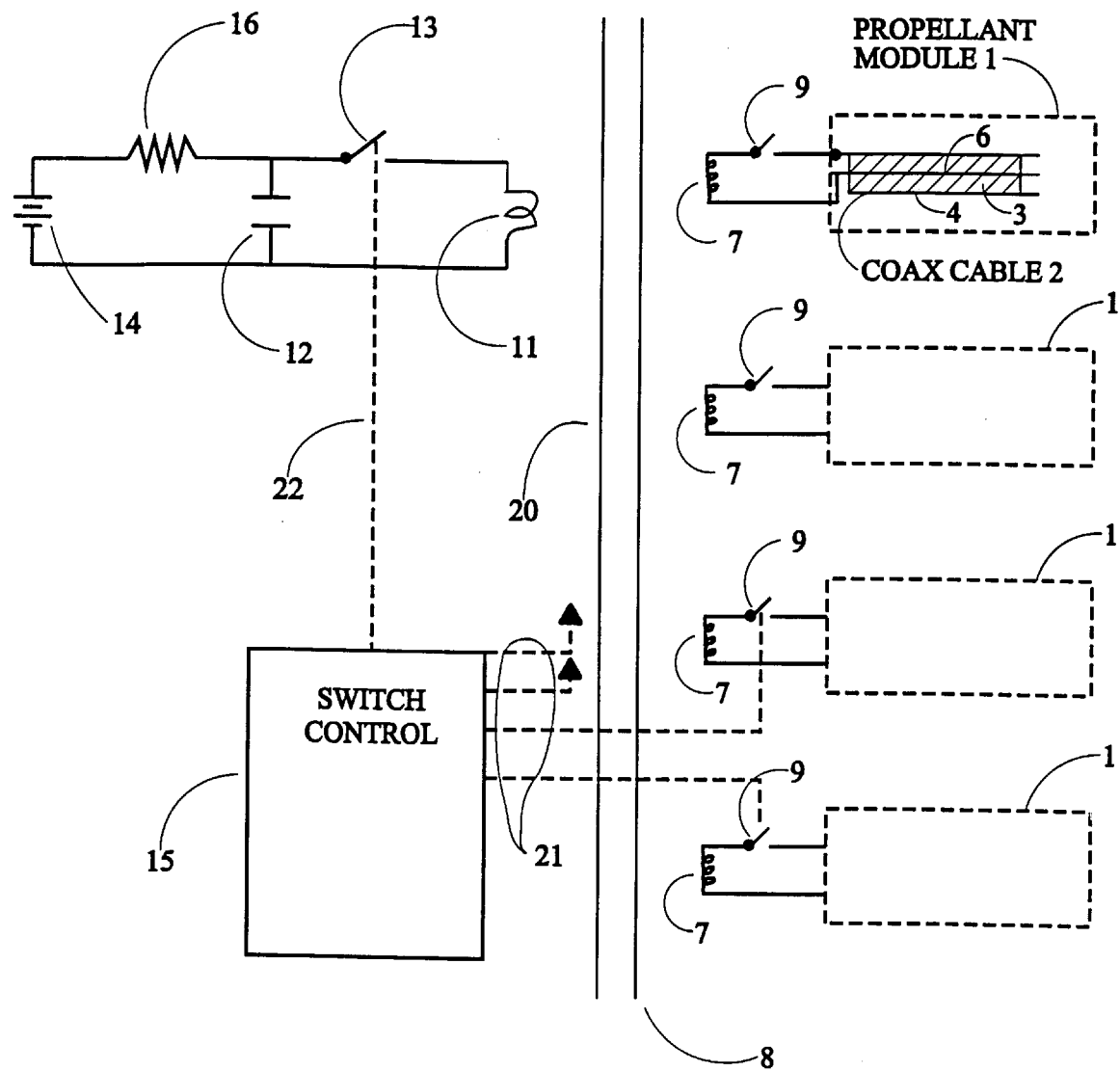

In the sole figure, propellant modules 1 are schematically illustrated for generating thrust in particular directions, depending upon their orientations. Each module includes a segment of an ordinary coaxial cable 2, having a "TEFLON" copolymer spacer or core 3 positioned between outer semi-rigid cylindrical conductor 4 and inner conductor 6, in the well known configuration.

Each cable segment is connected across an associated secondary winding 7 of voltage step-up transformer 8 via a switch 9, as shown. Primary winding 11 of the transformer is coupled to energy storage capacitor 12 via switch 13. The storage capacitor 12 may be charged up by voltage source 14 via adjustable resistor 16. Assume the uppermost propellant module is to produce thrust at a particular time. This is effected by closing switch 9, charging capacitor 12, and thereafter closing switch 13. Rapid discharge of energy previously stored in the energy storage capacitor occurs in microseconds across the selected coaxial cable segment, which produces vaporization of the spacer copolymer 3, to in turn produce a single thrusting impulse. The thrust is created by the ablated material accelerating out through a combination of electro-thermal and self-field electromagnetic forces. A high voltage pulse of at least 1000 volts, is thus generated by capacitor 12 and the secondary transformer winding and is applied to coaxial cable components 4 and 6, acting as electrodes.

Switch control circuit 15 of the thruster control means 20 is coupled to the switches as indicated, and thus is used to selectively apply the high voltage impulses to selected propellant modules. These modules are oriented in various directions to control positioning and acceleration of the space crafts in desired directions as is well known to those skilled in the art. Alternatively, a single or a multitude of the modules can be oriented in one direction to provide primary, or bit transfer, propulsion for small spacecraft. This arrangement results in a light weight, low cost thruster comprising several propellant modules 1 and the thruster control apparatus shown. Coaxial cables can also be beneficially used to connect the secondary windings of the transformer to the separated propellant modules. These coaxial cables together with the cable segments in the modules also beneficially reduce EMI or electromagnetic radiation.

Optionally, this arrangement can use propellants other than coaxial cable segments, but in any case, the aforesaid undesirable spark plug igniters are eliminated by the described arrangement. Good results were attained by the application of pulses to the modules 1 using conventional coaxial cable segments in the 1800–3000 volt range. The cables contained conventional "TEFLON" tetrafluoroethylene copolymer spacer material therein. As mentioned above, changing the capacitor discharge frequency and thus the frequency of the resulting pulse train applied across the coax components can also be used to change the degree of thrust. This could be effected by altering the setting of adjustable resistor 16 to change the RC time constant, since switch 13 is only closed after full charge-up.

Numerous variations of the foregoing arrangement will be obvious to workers skilled in the art, and thus the scope of the invention is to be limited solely to the terms of the following claims and art recognized equivalents. For example, the switches could be mechanical, as indicated, or be of the solid state variety. Voltage step up circuitry could be provided other than the transformer illustrated. Such circuitry, well known to those skilled in the electrical arts, include Marx bank capacitor stacking, or Blumlein inductive stacking. Alternatively, the voltage step-up can be eliminated by simply charging the capacitor to a higher initial voltage. In the ideal case, voltage step-up is sufficient to allow for charging directly from the spacecraft power bus to eliminate the need for a separate power processing unit to charge the capacitor to voltages higher than the spacecraft power bus. The ablated propellant could comprise electrically conductive propellants described in a copending patent application of Gregory Spangers, rather than the insulating material found in commercially available RF coaxial cables. Cable variations include employing a cable with a thick outer shell which would remain after the ablation of the propellant and the inner conductor, or a thin outer shell which would ablate with the propellant. Another alternative could involve micro-machining a cylindrical spring surrounding the inner conductor and biased against the back end of the cylindrical propellant to feed it to the front as it is ablated without any loss of the inner and outer electrode conductors.

What is claimed is:

1. In a thruster particularly well adopted to control the attitude of a small space satellite the improvement comprising:
   (a) at least one coaxial cable segment having an inner conductor and an outer conductive shell positioned about said inner conductor, together with spacer material positioned between said inner conductor and said outer conductive shell, which material can readily vaporize upon the application of a high voltage pulse applied thereto; and
   (b) thruster control means for applying said high voltage pulse across said spacer material.

2. The thruster of claim 1 wherein said spacer material comprises a tetrafluroethylene polymer.

3. The thruster of claim 1 wherein said high voltage pulse has a voltage of at least 1000 volts.

4. The thruster of claim 2 wherein said high voltage pulse has a voltage of at least 1000 volts.

5. In a thruster particularly well adopted to control the attitude of a small space satellite the improvement comprising:
   (a) a plurality of propellant modules, each module comprising a coaxial cable segment having an inner conductor and an outer conductive shell positioned about said inner conductor together with spacer material positioned between said inner conductor, and said outer conductive shell, which material can readily vaporize upon the application of a high voltage pulse applied thereto; and
   (b) a single thruster control means for selectively applying said high voltage pulse across spacer material of coaxial cable segments of selected ones of said modules.

6. The thruster of claim 5 wherein said spacer material comprises a tetrafluroethylene polymer.

7. The thruster of claim 5 wherein said high voltage pulse has a voltage of at least 1000 volts.

8. The thruster of claim 6 wherein said high voltage pulse has a voltage of at least 1000 volts.

9. The thruster of claim 5 wherein said thruster control means includes an energy storage capacitor together with switch means for coupling said energy storage capacitor across spacer material of selected propellant modules after charge up of said capacitor.

10. The thruster of claim 6 wherein said thruster control means includes an energy storage capacitor together with switch means for coupling said energy storage capacitor across spacer material of selected propellant modules after charge up of said capacitor.

11. The thruster of claim 7 wherein said thruster control means includes an energy storage capacitor together with switch means for coupling said energy storage capacitor across spacer material of selected propellant modules after charge up of said capacitor.

12. The thruster of claim 8 wherein said thruster control means includes an energy storage capacitor together with switch means for coupling said energy storage capacitor across spacer material of selected propellant modules after charge up of said capacitor.

13. In a thruster particularly well adopted to control the attitude of a small space satellite the improvement comprising:
   (a) a plurality of propellant modules, each module comprising a first and second electrode with spacer material positioned between said first and second electrode, which spacer material can readily vaporize upon the application of a high voltage pulse applied thereto; and
   (b) a single thruster control means for selectively applying electrical energy stored within a single energy storage capacitor across spacer material of selected ones of said modules.

14. The thruster of claim 13 wherein said spacer material comprises a tetrafluroethylene polymer.

15. The thruster of claim 13 wherein discharge of said energy storage capacitor applies a voltage pulse of at least 1000 volts across said spacer material.

16. The thruster of claim 14 wherein discharge of said energy storage capacitor applies a voltage pulse of at least 1000 volts across said spacer material.

17. The thruster of claim 13 wherein said thruster control means includes switch means for coupling said energy storage capacitor across spacer material of selected propellant modules after charge up of said capacitor.

18. The thruster of claim 14 wherein said thruster control means includes switch means for coupling said energy storage capacitor across spacer material of selected propellant modules after charge up of said capacitor.

19. The thruster of claim 15 wherein said thruster control means includes switch means for coupling said energy storage capacitor across spacer material of selected propellant modules after charge up of said capacitor.

20. The thruster of claim 16 wherein said thruster control means includes switch means for coupling said energy storage capacitor across spacer material of selected propellant modules after charge up of said capacitor.

21. A thruster for a spacecraft comprising,
   a) spaced coaxial conductors having an inner conductor and an outer shell conductor positioned about said inner conductor, which conductors are separated by propellant spacer material, which material can ablate or vaporize upon application of a high voltage pulse thereto and b) thruster control means for applying said high voltage pulse to said conductors across said propellant spacer material.

22. The thruster of claim 21 wherein said spacer is selected from the group of ablative material, solid material and copolymer material.

23. The thruster of claim 21 wherein commercially available RF coaxial cable is employed as said coaxial conductors.

24. A compact thruster for a spacecraft comprising,
a) spaced coaxial spaced conductors having an inner conductor and an outer shell conductor positioned about said inner conductor, which conductors are separated by propellant spacer material, which material can ablate or vaporize upon application of a high voltage pulse applied thereto,
b) a first circuit having a first switch electrically connecting said spaced conductors,
c) a pulse generating circuit having a power supply connected across a capacitor,
d) a pulse discharge circuit having a second switch also connected across said capacitor, said pulse discharge circuit being electrically connected to said first circuit by voltage step-up means, such that upon closing said first switch and then closing said second switch, said capacitor delivers a high voltage pulse through said pulse discharge circuit and across said conductors ablating or vaporizing a portion of said spacer therebetween, generating thrust.

* * * * *